United States Patent

Heightley et al.

[15] 3,693,173

[45] Sept. 19, 1972

[54] TWO-TERMINAL DUAL PNP TRANSISTOR SEMICONDUCTOR MEMORY

[72] Inventors: John Donnell Heightley, Basking Ridge; Sigurd Gunther Waaben, Princeton, both of N.J.

[73] Assignee: Bell Telephone Laboratories, Incorporated, Murray Hill, N.J.

[22] Filed: June 24, 1971

[21] Appl. No.: 156,339

[52] U.S. Cl.................340/173 R, 307/320, 307/238

[51] Int. Cl. ..............................................G11c 11/36

[58] Field of Search....340/173 R; 307/238, 317, 320

[56] References Cited

UNITED STATES PATENTS 3,505,527 4/1970 Slana .....................340/173 R 3,508,211 4/1970 Wegener................340/173 R

*Primary Examiner*—Terrell W. Fears
*Attorney*—R. J. Guenther et al.

[57] ABSTRACT

A semiconductor memory contains memory cells that each have only two terminals and each comprise two serially connected semiconductor transistors or diodes. Bit information is written into the cell by raising the potential of one or both of the terminals so as to cause the common node between the semiconductor devices to be increased in potential to one of two levels which represent respectively a "1" and a "0". The reading out of and detection of stored information is accomplished by increasing the potential of one of the two terminals such that current flows into the cell only if the cell contains a stored "0".

8 Claims, 4 Drawing Figures

INVENTORS J. D. HEIGHTLEY
S. G. WAABEN
BY [signature]
ATTORNEY

TWO-TERMINAL DUAL PNP TRANSISTOR SEMICONDUCTOR MEMORY

BACKGROUND OF THE INVENTION

This invention relates to semiconductor memory apparatus which utilizes memory cells of relatively simple structure.

In many computer and other systems there exists the need for large information capacity semiconductor memories in which information can be temporarily stored and then retrieved within a useful period of time. Therefore it is desirable that each memory cell of the large array be of relatively low structural complexity, require a relatively simple fabrication process, and consume relatively low power. In addition, the number of terminals per cell should be relatively low to simplify interconnection and physical size.

A three-terminal memory cell, developed in 1951 by the National Bureau of Standards, consists of two serially connected diodes with a series combination of a resistor and capacitor connected between the common node of the diodes and ground. The three terminals consist of the anode of the first diode, the cathode of the second line and the node between the resistor and capacitor. Even diode, the cell structure is relatively simple, the necessity of having three connections to each cell lessens its desirability for use in large memory arrays. In the publication Electronics Review of Mar. 1, 1971, an article entitled "Bipolar Memory Cells Strike Back in War With MOS" on page 19 and the copending U.S. applications (D. L. Lynes-J. Mar 9–3 and 10–4) Ser. Nos. 103,169 and 103,167, filed Dec. 31, 1970, a two-terminal memory cell consisting of two back-to-back silicon diodes or a silicon transistor which contains two back-to-back diodes is described. The described structure requires relatively little silicon area for its implementation, requires a relatively simple fabrication process, and has only two terminals, but requires avalanche breakdown of one of the two junctions. While this device has desirable features it is well recognized that repeated avalanche breakdown tends to degrade semiconductor device performance.

In an article published in the IEEE Journal of Solid-State Circuits, Volume SC-5, No. 5, Oct. 1970, pages 192–196, entitled "100-ns Electronically Variable Semiconductor Memory Using Two Diodes per Memory Cell" by Sigurd G. Waaben, who is a coinventor in this present invention, and Herbert A. Waggener and in the copending U.S. application (S. G. Waaben 12) Ser. No. 864,705, filed Oct. 8, 1969, a two-terminal memory consisting of two serially connected diodes having different minority carrier lifetimes is described. This cell operates without the use of avalanche breakdown, has fewer components than the National Bureau of Standards' memory cell, and needs only two terminals. One requirement of this cell is that the two diodes have different minority carrier lifetimes. This requirement limits the choice of the fabrication technology.

OBJECTS OF THE INVENTION

It is a primary object of this invention to provide a two-terminal semiconductor memory cell which is of relatively simple structure and is easily fabricated using standard integrated circuit techniques.

It is another object of this invention to provide a memory cell whose operation does not require avalanche breakdown.

It is a further object of this invention to provide a two-terminal semiconductor memory cell which meets the above-mentioned objectives and consists of only two semiconductor devices, such as transistors or diodes.

It is a still further object of this invention to provide a relatively large capacity semiconductor memory using interconnected memory cells, each of which meets the above-mentioned objectives.

SUMMARY OF THE INVENTION

These and other objects of the invention are attained in an illustrative embodiment thereof comprising a semiconductor memory array consisting of a plurality of interconnected two-terminal memory cells that each contain two serially connected PNP transistors. In each of the memory cells the base of the first transistor is connected to the emitter of the second transistor and the emitter of first transistor and the base of second transistor serve as the cell terminals. Control lines connected to the emitter terminals will be denoted as digit lines and control lines connected to the base terminals will be denoted as word lines.

The emitter-base junctions of the first transistors are fabricated in as small an area of semiconductor material as technology permits in order to minimize parasitic capacitance associated with them. This electrically isolates the digit lines from the word lines. In addition it isolates the digit lines from the common node between the transistors except when the emitter-base of a first transistor is forward-biased.

Bit information is written into a selected cell by raising the potential of the appropriate word line and either raising or not raising the potential of the appropriate digit line thus causing the common node between the two transistors of the cell to be increased in potential to one of two levels. The increase in potential of the word line is capacitively coupled through the parasitic capacitances associated with the emitter and the emitter-base junction of the second transistor to the common node between the transistors. The potential of the common node is increased to a potential defined as a "0" state when only the word line potential is increased. If the digit line potential is then pulsed to the potential of the word line, the emitter-base junction of the first transistor is temporarily forward-biased and the common node's potential is increased from the "0" potential to a state defined as the "1" potential.

To read out information stored in the cell the digit line is increased in potential to the same value achieved during the write "1" operation. If a "0" is stored in the cell the emitter-base junction of the first transistor will be forward-biased and current will be drawn from the digit line into the cell. This is indicative of a stored "0." If a "1" is stored in the cell the emitter-base junction of the first transistor will not be forward-biased and there will not be a flow of current from the digit line into the cell. This is indicative of a stored "1" in the cell.

The clear operation is achieved by forward-biasing the emitter-base junctions of both transistors. During all other operations the emitter-base junction of the second transistor is reverse-biased, but not sufficiently to cause avalanche breakdown.

As will be explained, the transistors of the memory cell may be replaced by a variety of different type diodes including Schottky barrier diodes. In addition, the ratio of the minority carrier lifetimes of the devices used is relatively unimportant to cell operation. It is to be appreciated that since the memory cell herein described has inherently small physical size due to its relatively simple structure, can be economically interconnected because of the need to only make two connections per cell, does not require special fabrication techniques or differences in characteristics between the two component semiconductor devices, and does not require avalanche breakdown, that it is well suited as a component of large information capacity memory arrays.

These and other objects, features and embodiments will be better understood from a consideration of the following detailed description taken in conjunction with the accompanying drawing.

DETAILED DESCRIPTION

Figure 1:
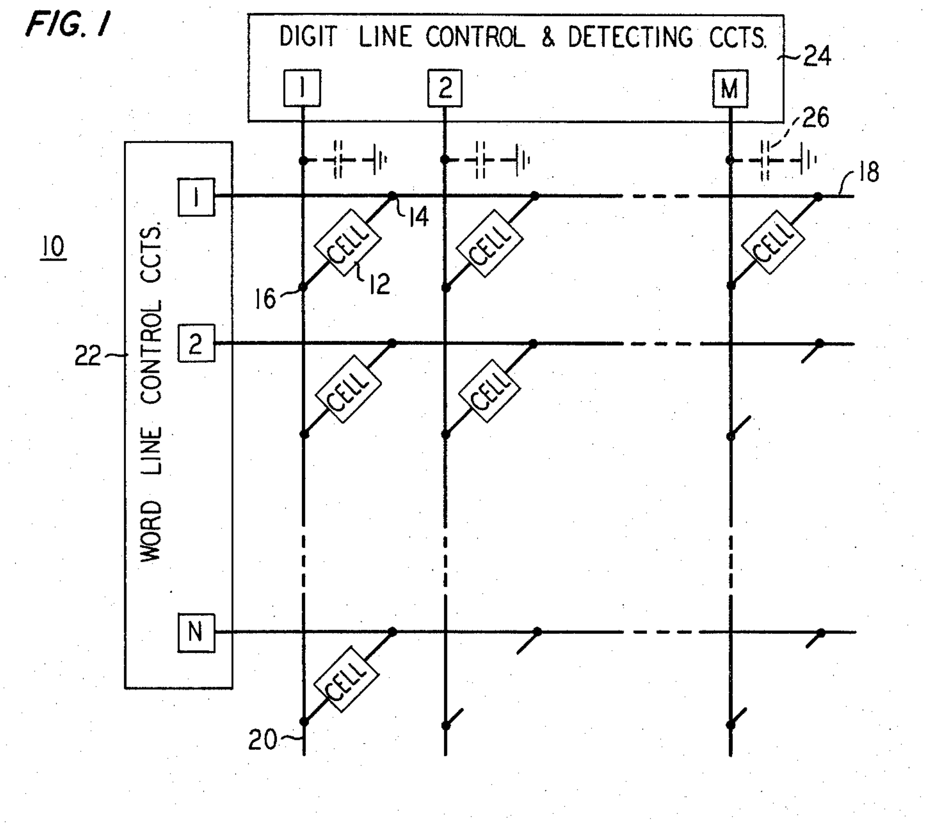
FIG. 1 illustrates a block circuit for a memory system in accordance with this invention.

Referring now to FIG. 1, there is shown the basic elements of a word-organized memory system 10 in accordance with this invention. A plurality of individual memory cells 12 are arranged in a two-dimensional array of M rows and N columns to form a memory having M×N memory cells. Each of the memory cells 12, which as illustrated has two terminals 14 and 16, is capable of storing bit information for a useful period of time. One of the two terminals 14 is connected to a word line 18 and the other terminal 16 is connected to a digit line 20. All of the word lines 18 are connected to word line control circuits 22 and all of the digit lines 20 are connected to digit line control and detecting circuits 24. Parasitic capacitance 26 is the effective capacitance on each digit line; it is the sum of all the input capacitances of all the memory cells connected to a particular digit line and the parasitic capacitance associated with the line itself.

Figure 2:
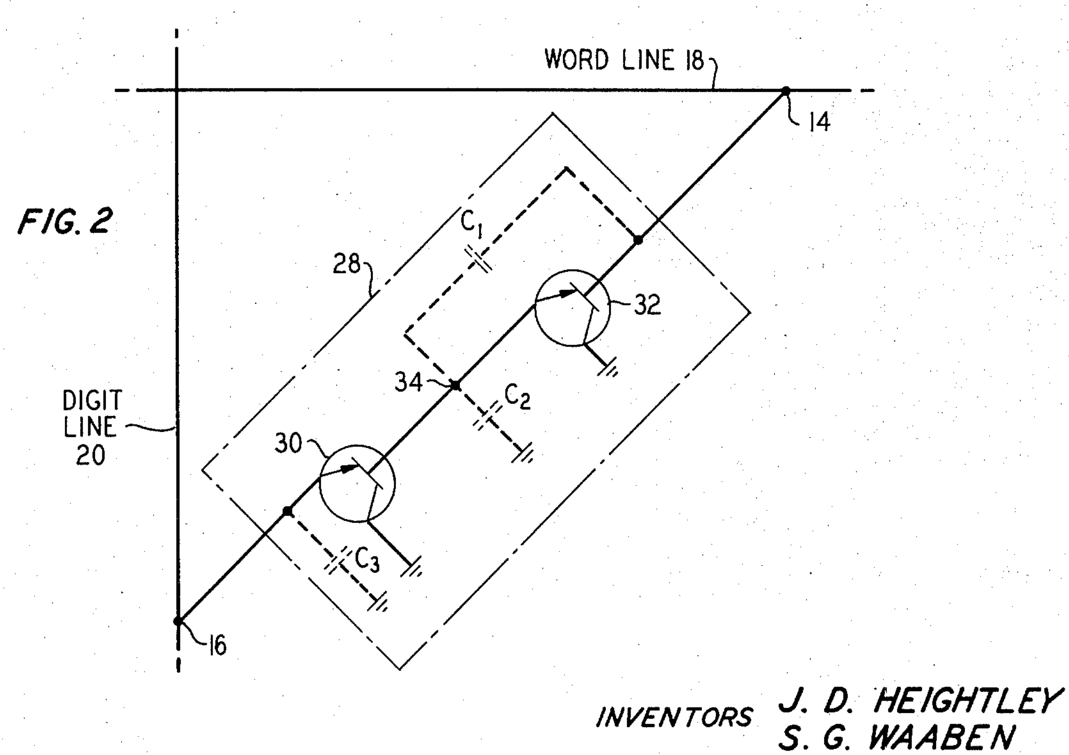
FIG. 2 illustrates a schematic circuit of one memory cell suitable for use in the memory system of FIG. 1.

Referring now to FIG. 2, there is illustrated a circuit schematic of a preferred memory cell suitable for use as the memory cell 12 illustrated in FIG. 1. More specifically, the cell shown inside the broken line rectangle 28 comprises a preferred embodiment of the inner structure of cell 12 of FIG. 1. As illustrated, the cell comprises a pair of PNP junction transistors 30 and 32 which are serially connected such that the base of transistor 30 is connected to the emitter of transistor 32. The common node between the connected base and emitter is denoted as node 34. Cell terminal 16, which in this figure is the emitter of transistor 30, is connected to a digit line 20. Cell terminal 14, which in this figure is the base of transistor 32, is connected to a word line 18. Parasitic capacitance $C_1$ is associated with the emitter-base junction of transistor 32 and parasitic capacitance $C_3$ is associated with the emitter of transistor 30. Parasitic capacitance $C_2$ is the equivalent capacitance of the parasitic capacitance of the collector-base junction of transistor 30 and the parasitic capacitance associated with the emitter of transistor 32. The emitter-base junction of transistor 30 is fabricated in as small an area of silicon as technology permits in order to minimize the parasitic capacitance associated with it. Typically when the emitter area is only 7 by 7 microns the parasitic capacitance associated with the emitter-base junction of transistor 30 is only 0.02 picofarad. This allows digit line 20 to be electrically isolated from node 34 except when the emitter-base junction of transistor 30 is forward-biased. In addition it electrically isolates the word line 18 from the digit line 20. $C_1$ couples the word line 18 to node 34; $C_2$ couples node 34 to ground potential. The parasitic capacitance, $C_3$, associated with the emitter of transistor 30, is significantly smaller than $C_1$ and $C_2$. Typically, $C_3$ is 0.05 picofarad while $C_1$ and $C_2$ are each 0.3 picofarad. Typically, the area of the emitter of transistor 32 is one square mill.

In typical operation, the memory cell of FIG. 2 is first cleared of all previously stored bit information by grounding the word line 18 and the digit line 20. In order to write a "0" into the cell, the potential of the word line 18 is then increased to a first positive potential. This change in potential of the word line 18 is capacitively coupled to node 34, which increases from ground potential to a potential less positive than the word line potential. This potential on node 34 is defined as the "0" potential or state. Typically, the word line is increased to +3 volts and a "0" potential is +1.5 volts.

In order to write a "1" into the cell, it is necessary to perform the same operation required for the writing of a "0" and in addition to increase the digit line potential from ground potential to approximately the same positive potential as the word line. The raising of the digit line potential causes the emitter-base junction of transistor 30 to be temporarily forward-biased thereby causing node 34 to approach the potential of the digit line. This potential on node 34 is defined as the "1" potential. Typically it is approximately +3 volts.

The next step, known as the holding step, which occurs prior to the reading out or retrieving of information stored in the cell, is required to maintain the stored bit information. The potential of the word line is increased to typically +9 volts from the previous potential of typically +3 volts. This increase in potential causes node 34 to increase in potential according to the ratio of the capacitances $C_1$ and $C_2$. If a "0" (+1.5 volts) is stored in the cell, node 34 assumes a potential of approximately +4.5 volts; if a "1" (+3 volts) is stored in the cell, node 34 assumes a potential of approximately +6 volts. The increase in the potential of the word line 18 is sufficient so that whether a "1" or a "0" is stored in the cell the potential of node 34 will be greater than that of the digit line 20 potential. This means that the emitter-base junction of transistor 30 can't be forward-biased and therefore a "1" can not be written into the cell while its word line is maintained at the hold potential.

In order to read information out of the cell, the word line potential is then decreased to the "1" potential (+3 volts) from the hold potential (+9 volts) while the digit line potential is at the "1" potential. This causes the node 34 potential to return to the value it occupied when the word line potential was first increased to +3 volts. If a "1" is stored in the cell, the potential of node 34 will be approximately equal to the digit line potential and therefore there will be no forward-bias across the emitter-base junction of transistor 30 and therefore no current will flow into the cell from the digit line 20. This is indicative of a stored "1" in the cell. If, however, the cell had stored a "0", then the potential of the digit line 20 will be greater than that of node 34 and the emitter-base junction of transistor 30 will be forward-biased and current will flow from the digit line 20 into the cell 12. This flow of current is indicative of a "0" stored in the cell.

It is to be noted at this point that all of the above described memory cell operations do not require avalanche breakdown of a semiconductor junction. In addition it is to be noted that the ratio of the minority carrier lifetimes of the two transistors is not important to cell operation as it is in prior art cells.

As has been denoted previously, the memory array of FIG. 1 is a word-organized memory. This means that when bit information is written into a selected memory cell that all other memory cells coupled to the same word line as the selected cell are also written into. The operation of a single memory cell has been described above. In order to ensure that bit information stored in all the other unselected memory cells is not altered during write-in of the selected cell, it is necessary to maintain all of non-selected word lines at the hold potential (+9 volts). This causes the potentials of the common nodes between the two transistors, which comprise each memory cell, to be all raised to a potential greater than the "1" potential, thus preventing the destruction of bit information stored in these cells.

As has been explained, in order to write a "1" into a selected memory cell the digit line and word line coupled to this cell are both raised to the "1" potential. If nothing else is done a "1" will be written into the selected cell and "0+s" will be written into each of the other cells coupled to the common word line. If it is desired "1's" may be written into these other cells simultaneously with the writing of a "1" into the selected cell by increasing the digit lines coupled to these cells to the "1" potential.

Figure 3:
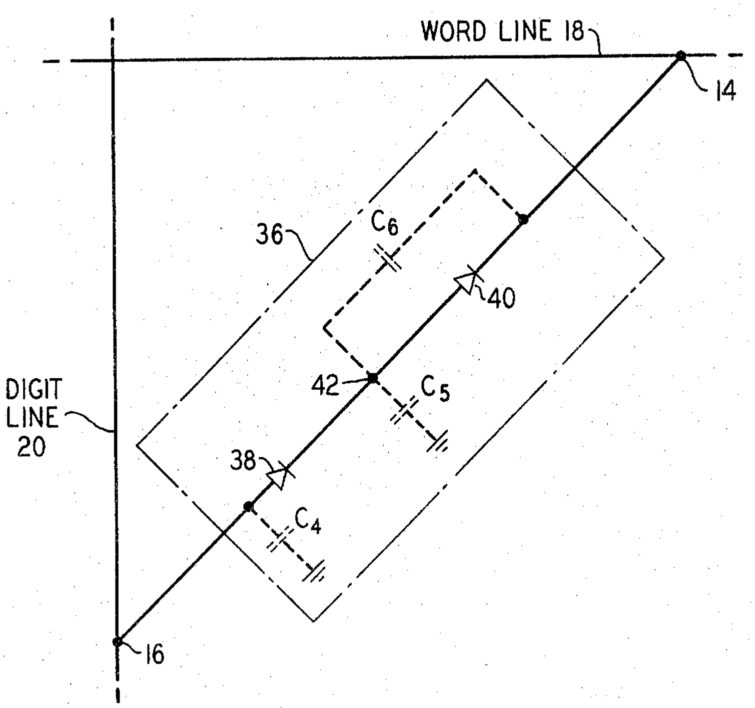
FIG. 3 illustrates a schematic circuit of a second memory cell also suitable for use in the memory system of FIG. 1.

Referring now to FIG. 3, there is illustrated still another circuit schematic of a memory cell suitable for use as the memory cell 12 illustrated in FIG. 1. More specifically, the cell shown inside the broken line rectangle 36 comprises another embodiment of the inner structure of cell 12 of FIG. 1. As illustrated, the cell comprises a pair of diodes 38 and 40 which are serially connected such that the cathode of diode 38 is connected to the anode of diode 40. The common node between the connected cathode and anode is denoted as node 42. Cell terminal 16, which in this figure is the anode of diode 38, is connected to a digit line 20. Cell terminal 14, which in this figure is the cathode of diode 40, is connected to a word line 18. Parasitic capacitance $C_6$ is the capacitance across diode 40 and parasitic capacitance $C_4$ is the capacitance associated with the anode of diode 38. Parasitic capacitance $C_5$ is the equivalent capacitance which represents the parasitic capacitance associated with the cathode of diode 38 and the anode of diode 40. Parasitic capacitances $C_5$ and $C_6$ couple node 42 to ground potential and to the word line 18 potential respectively. Diode 38 is fabricated in as small an area of silicon as technology permits in order to minimize parasitic capacitance across it. Parasitic capacitance $C_4$ is significantly smaller than $C_5$ and $C_6$. The diodes 38 and 40 may either be standard types or a number of other types including Schottky barrier diodes. The use of Schottky barrier diodes allows for relatively high speed operation. The operation of this cell is almost identical to that of the cell of FIG. 2.

Bit information, stored in the memory cells of FIGS. 2 and 3 as the potential of the common node between the junctions, will tend to be destroyed in time due to the reverse leakage current through the two reverse junctions associated with the memory cells. It is therefore necessary to refresh (rewrite information into) the memory cells periodically. Typically, it has been found necessary to refresh only every 5 to 10 milliseconds.

Figure 4:
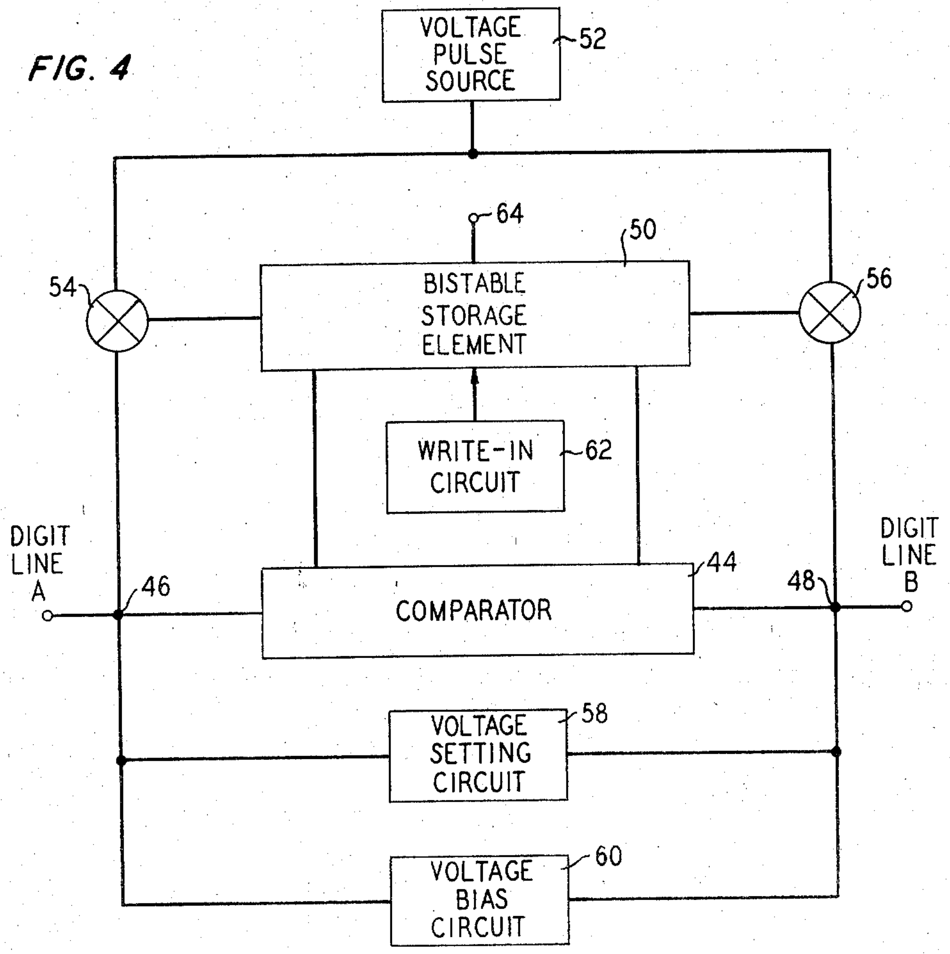
FIG. 4 illustrates a schematic circuit for the digit line control and detecting circuits of FIG. 1.

Now referring to FIG. 4 there is illustrated a preferred embodiment of the digit line control and detecting circuits 24, of FIG. 1. The outputs of a comparator 44, which has two inputs 46 and 48, are coupled to a bistable storage element 50 and to a voltage pulse source 52 through switches 54 and 56. The storage element 50, which is coupled to each of the switches 54 and 56, controls the position of the switches. In addition, a voltage setting circuit 58 and a voltage bias circuit 60 are both coupled to inputs 46 and 48 of the comparator 44.

A digit line A from a memory array like the one of FIG. 1 is connected to input 46 of the comparator 44. Another digit line B from a second memory array like the one of FIG. 1 is connected to input 48 of the comparator 44. Information may be selectively written into or read out of either of two memory cells which are respectively coupled to digit lines A and B. Both memory arrays may consist of memory cells of the type shown in FIG. 2 or FIG. 3.

In preliminary operation, to read out and detect information stored in a selected memory cell of the first array the potentials of inputs 46 and 48 are first both adjusted by the voltage setting circuit 58 to the "1" potential. This means that the capacitor $C_3$ of the memory cell of FIG. 2 or $C_4$ of the memory cell of FIG. 3 is set to approximately +3 volts. The voltage bias circuit 60 then lowers and holds the potential on input 48 to a reference potential which is between the "1" and "0" potentials.

During the above-mentioned preliminary readout and detection operation the potential of the word line connected to the selected cell, whose digit line A is connected to input 46 of the comparator 44, is then lowered from the hold potential (+9 volts) to the "1" potential (+3 volts). This causes node 34 of FIG. 2 or node 42 of FIG. 3 to return to a "1" or "0" potential, depending upon the information previously stored in the cell. If the cell previously contained a "0" (+1.5 volts) then the emitter-base junction of transistor 30 is forward-biased since its emitter is at +3 volts and its base is at +1.5 volts. As a consequence of this forward-bias condition, current flows from the digit line capacitance $C_3$ into the cell. This causes the potential across capacitance $C_3$ to drop from the "1" potential toward the "0" potential. As a practical matter since the current gain of transistor is not infinitely high and $C_3$ is not infinitely small the potential across $C_3$ will return to a value relatively near but not equal to the "0" potential. If a "1" is stored in the cell the above-mentioned emitter-base junction is not forward-biased and the potential across capacitor $C_3$ remains at the "1" potential.

At this point in time the state of the potential on capacitance $C_3$ is indicative of the stored information in the cell. Depending upon the the potential of capacitance $C_3$, the comparator 44 will assume one of two states. Since the outputs of the comparator 44 are coupled to the inputs of the bistable storage element, any change of state or imbalance in the comparator 44 will trigger the bistable storage element 50 to one of two states. The state assumed by the bistable storage element is indicative of the information stored in the selected memory cell which is coupled to digit line A. This state is determined by monitoring the potential of output terminal 64 of the storage element 50. To read out and detect information stored in the second selected memory cell, whose digit line B is connected to input 48 of comparator 44, the same procedure used for reading out information in the first cell is followed except input 46 to the comparator 44 now serves as the reference input instead of input 48.

In order to clear all information from either of the two above-mentioned memory cells the voltage pulse source 52 is maintained at approximately ground potential and the potential of the word line connected to the selected cell is lowered to ground potential. This allows both transistors of the memory cell illustrated in FIG. 2 to be forward-biased and thereby allows node 34 to assume ground potential.

A write-in pulse signal from write-in circuit 62 is inserted into the bistable storage element 50 which causes it to be set to a selected state which causes switch 54 to close if a "1" is to be written into the cell coupled to digit line A or switch 56 to close if a "1" is to be written into the cell coupled to digit line B. At this point in time the voltage pulse source 52 provides a voltage pulse whose high level is equal to the "1" potential. In addition the appropriate word line is also increased in potential to the value of the "1" potential. In order to write a "0" into either cell the same procedure is followed as for writing a "1" except that the bistable storage element is set by the write-in circuit 62 to the opposite state required to write a "1" into either of the cells.

As has been discussed, the reading out of a stored "0" from a memory array utilizing memory cells of FIG. 2 ideally causes the potential across $C_3$ to drop from the "1" potential to the "0" potential. If transistor 30 had infinite current gain and $C_3$ were infinitely small than the $C_3$ potential would reach the "0" value at the end of the readout and detection operation. Diode 38 of FIG. 3 has no current gain and therefore the potential across $C_4$at the end of a readout and detection operation will not come as close to the "0" potential as the potential across $C_3$ of FIG. 2 does. This means that the potential difference between the readout of a "1" and a "0" stored is inherently greater when the transistor memory cell of FIG. 2 is utilized rather than the diode memory cell of FIG. 3.

The value of the effective capacitance 26 of FIG. 1 on a given digit line 20 is directly proportional to the value of $C_3$ of FIG. 2 or $C_4$ of FIG. 3, depending upon which memory cell is used in the array. Since the value of capacitance 26 is in addition directly proportional to the number of memory cells in the array, it is apparent that as the number of cells increases capacitance 26 will accordingly increase and detection sensitivity will decrease. Since for a given bit capacity memory array the transistor memory cell of FIG. 2 results in a greater difference in output potential between a "1" and "0" it is easier to compromise between detection sensitivity and increased bit capacity than in the case of the diode memory cell of FIG. 3. For example, a 64×64 memory array using the memory cell of FIG. 2 would typically yield a 500 millivolts difference in potential across capacitance 26 when a "0" is read out as compared to a "1." This assumes an ac current gain (beta) for transistor 30 of only 5. A corresponding memory array using the diode embodiment of FIG. 3 would yield only 100 millivolts across capacitance 26 during the same operation. The detection circuits of FIG. 4 are typically capable of detecting a difference of only 10 millivolts and therefore it will be possible to greatly increase the bit capacity of memory arrays before detection sensitivity becomes a serious problem.

From the aforegoing it is clear that the memory cells described are well suited as components for use in large information capacity memory arrays because their relatively simple structure allows for small physical size, only two connections need be made per cell, a variety of different types of semiconductor devices not requiring special information techniques or different characteristics may be employed, and there is no need for avalanche breakdown operation.

It is to be understood that the embodiments described are merely illustrative of the general principles of the invention. Various modifications are possible consistent with the spirit of the invention. For example, the digit line control and sensing circuits may be simply voltage pulse circuits in series with current detectors. In addition transistor 32 of FIG. 2 may be a diode, thus forming a memory cell consisting of a PNP transistor serially coupled to a diode.

Still further, the PNP transistors of FIG. 2 can be replaced by NPN transistors providing the relevant voltages are reversed.

We claim:

1. Semiconductor memory apparatus comprising:

a plurality of interconnected memory cells which each contain two terminals;

each of said memory cells comprising a first semiconductor device serially coupled to a second semiconductor device;

the first semiconductor device having a junction which is characterized in that it has a parasitic capacitance across it which is much smaller than the parasitic capacitance associated with any junction of the second semiconductor device;

first write-in means coupled to said cells for reverse-biasing both devices of a selected memory cell such that the potential of the common node between the devices is set to a first potential;

second write-in means coupled to said cells for forward-biasing the first semiconductor device and reverse-biasing the second semiconductor device of a selected cell such that the potential of the common node between the devices is set to a second potential; and readout means coupled to the cells for detecting and reading out information stored in the cells.

2. The apparatus of claim 1 wherein:

the first and second semiconductor devices are both PNP transistors;

the emitter of the first transistor and the base of the second transistor comprise the two terminals of the cell; and the base of the first transistor is coupled to the emitter of the second transistor.

3. The apparatus of claim 2 wherein:

the emitter-base junction of the second PNP transistor has a parasitic capacitance associated with it that couples the common node between the two PNP transistors to the base of the second PNP transistor; and the common node between the two PNP transistors has a parasitic capacitance associated with it which comprises the parasitic capacitance associated with the base of the first PNP transistor and the emitter of the second PNP transistor.

4. The apparatus of claim 1 wherein:

the first and second semiconductor devices are both diodes;

the anode of the first diode and the cathode of the second diode comprise the two terminals of the cell; and the cathode of the first diode is coupled to the anode of the second diode.

5. The apparatus of claim 4 wherein:

the second diode has a parasitic capacitance across it which couples the common node between the diodes to the cathode of the second diode; and the common node between the two diodes has a parasitic capacitance associated with it which comprises the parasitic capacitance associated with the cathode of the first diode and the anode of the second diode.

6. The apparatus of claim 4 wherein the diodes are both Schottky barrier diodes.

7. Semiconductor memory apparatus comprising:

two semiconductor memory arrays;

each of said arrays comprising a plurality of interconnected memory cells which each contain two terminals;

each of said memory cells comprising a first PNP transistor serially coupled to a second PNP transistor such that the base of the first transistor is coupled to the emitter of the second transistor;

the emitter of the first transistor serves as the first cell terminal and the base of the second transistor serves as the second cell terminal;

the emitter-base junction of the second transistor has a parasitic capacitance associated with it that couples the common node between the two transistors to the base of the second transistor;

the emitter-base junction of the first transistor is characterized in that it has a parasitic capacitance associated with it which is much smaller than the parasitic capacitance associated with the emitter-base junction of the second transistor;

the common node between the two transistors has a parasitic capacitance associated with it which comprises the parasitic capacitance associated with the base of the first transistor and the emitter of the second transistor;

first voltage pulse circuits coupled to the memory cells of the first memory array for reverse-biasing the emitter-base junctions of both transistors of a selected memory cell such that the potential of the common node between the transistors is set to a first potential;

second voltage pulse circuits coupled to the memory cells of the second memory array for reverse-biasing the emitter-base junctions of both transistors of a selected memory cell such that the potential of the common node between the transistors is set the the first potential;

first write-in means coupled to said cells of both memory arrays for selectively forward-biasing the emitter-base junction of the first transistor of a selected cell and reverse-biasing the emitter-base junction of the second transistor of the selected cell such that the potential of the common node between the transistors is set to a second potential; and readout means coupled to the cells of both memory arrays for detecting and reading out information stored in the cells of both memory arrays.

8. The apparatus of claim 7 wherein the first write-in means and the readout means comprise:

circuitry comprising a two input comparator;

the first input of the comparator being coupled to the first terminal of a selected memory cell from the first array and the second input to the comparator being coupled to the first terminal of a selected memory cell of the second array;

the outputs of the comparator being coupled to the inputs of a bistable storage element that is coupled to and controls the state of first and second switches that respectively couple a voltage pulse source to the two inputs of the comparator;

voltage setting means coupled to both inputs of the comparator for setting both inputs to the same potential;

voltage bias means coupled to both inputs of the comparator;

said voltage bias means adapted to allow separate adjustment of the potentials of the inputs to the comparator; and second write-in means coupled to the bistable storage element for setting the state of the bistable storage element.

* * * * *